United States Patent [19]

Lavin

[11] Patent Number: 4,854,750
[45] Date of Patent: Aug. 8, 1989

[54] ZERO CLEARANCE BEARING SYSTEM

[76] Inventor: Aaron M. Lavin, 3500 Davisville Rd., Hatboro, Pa. 19040

[21] Appl. No.: 254,287

[22] Filed: Oct. 6, 1988

[51] Int. Cl.$^4$ .......................... F16C 19/08; F16C 23/10
[52] U.S. Cl. .................................... 384/500; 384/447; 384/504; 384/512; 384/541; 384/584
[58] Field of Search ............... 384/447, 450, 456, 461, 384/490, 504, 500, 501, 512, 517–519, 535–542, 581–585, 255

[56] References Cited

U.S. PATENT DOCUMENTS

| | | | |
|---|---|---|---|
| 1,364,675 | 1/1921 | Almfelt | 384/504 |
| 1,427,818 | 9/1922 | Hutchinson | 384/512 |
| 1,643,156 | 9/1927 | Farmer | 384/519 |
| 2,499,837 | 3/1950 | Sheets et al. | 384/512 X |
| 3,264,042 | 8/1966 | Maly et al. | 384/447 |
| 3,482,125 | 12/1969 | Fleckstein | 384/537 X |

FOREIGN PATENT DOCUMENTS

| | | | |
|---|---|---|---|
| 23787 | 11/1918 | Denmark | 384/490 |
| 493630 | 3/1930 | Fed. Rep. of Germany | 384/584 |
| 335120 | 9/1930 | United Kingdom | 384/584 |

Primary Examiner—Thomas R. Hannon
Attorney, Agent, or Firm—Caesar, Rivise, Bernstein, Cohen & Pokotilow, Ltd.

[57] ABSTRACT

A bearing assembly supporting a shaft for rotation about its longitudinal axis comprising, a support, at least three outer races, a plurality of rolling elements, and at least three inner races. Each of the outer races comprises a circular inner surface of a respective ring member. The inner races comprise respective circular outer surfaces in the shaft which are concentric and disposed laterally of one another along the longitudinal axis. The ring members are disposed opposite to respective ones of the inner races to form laterally disposed annular spaces in which plural rolling elements are located. One ring member is arranged to be adjustably moved by a spring inward radially with respect to the axis from a first point on the circumference thereof to take up the clearances at that point. Another ring is arranged to be adjustably moved by a spring inward radially with respect to the axis from a second point on the circumference thereof located approximately 120 degrees from the first point to take up the clearances at that point. Once the two rings are moved to position they are locked in place with an adhesive.

22 Claims, 4 Drawing Sheets

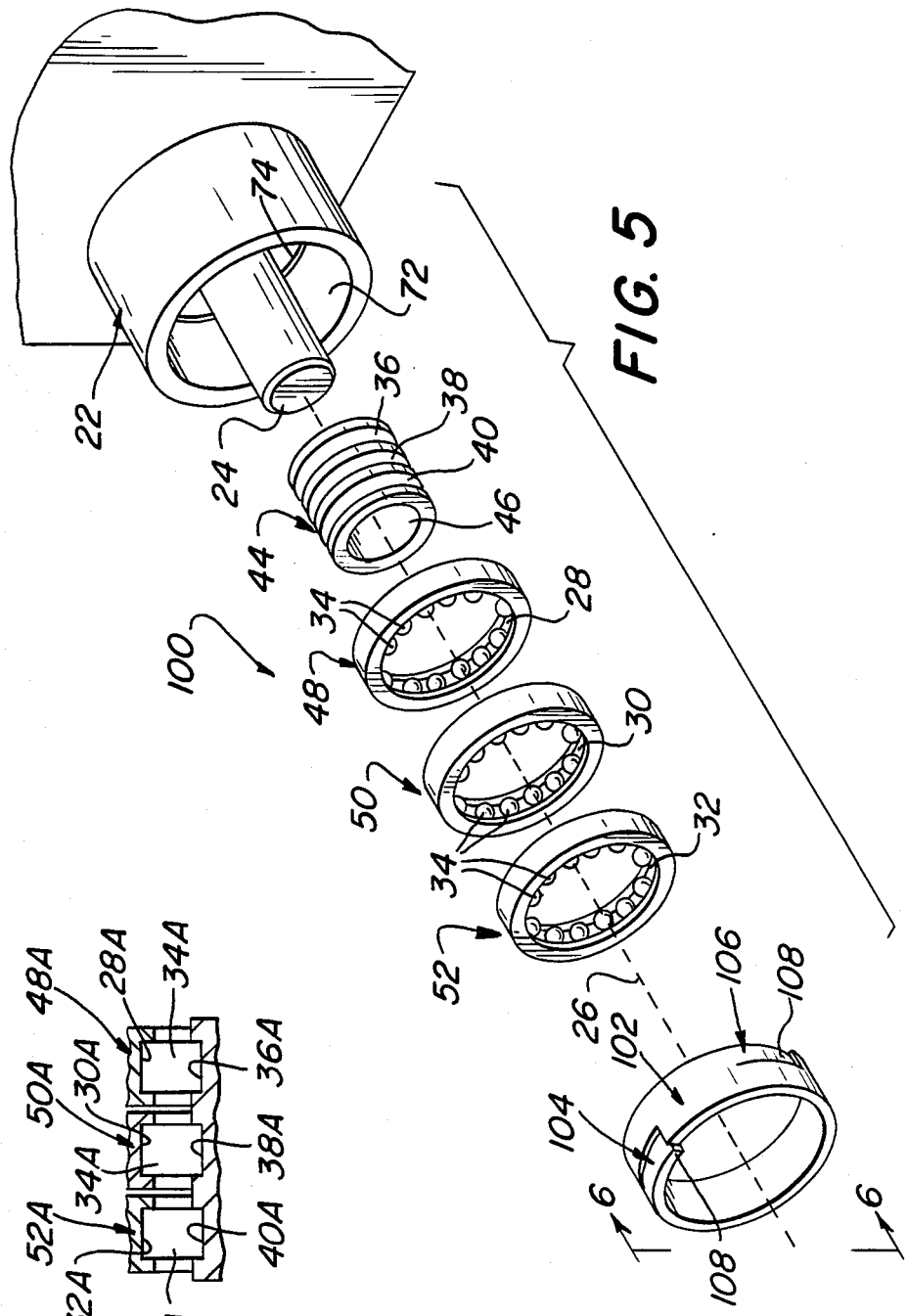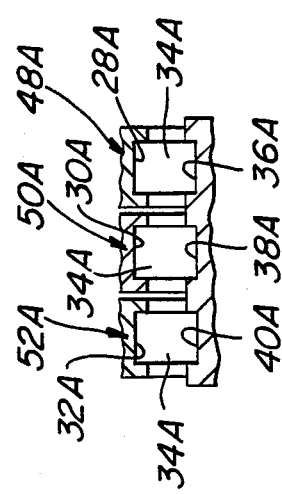

ZERO CLEARANCE BEARING SYSTEM

BACKGROUND OF THE INVENTION

This invention relates generally to bearings and more particularly to precision bearing systems.

Precison bearing systems are commercially available. However, such systems commonly make use of precise or high tolerance components, e.g., raceways, bearings, support structures, etc., in order that there will be little or no clearance between the moving components. While such bearings systems are suitable for their intended purposes, the need for precision tolerance components renders such systems, difficult to manufacture and expensive. Accordingly, a need presently exists for a bearing system which is simple in construction and which need not be made up of as many high tolerance (precision) components as the prior art.

U.S. Pat. No. 1,427,818 (Hutchinson) discloses an antifriction bearing mounting for a grinding wheel which utilizes movable means to take up slack which results from the operation of the grinding wheel. While that mounting may be suitable to take out some slack between the moving components, it does not appear to be precision bearing system formed of mostly non-precision components.

OBJECTS OF THE INVENTION

Accordingly, it is a general object of this invention to provide a system which overcomes the disadvantages of the prior art.

It is a further object of this invention to provide a precision bearing system which can be made up of several low tolerance components.

It is still a further object of this invention to provide a precision bearing system which is simple in construction and can be manufactured easily.

It is yet a further object of this invention to provide a bearing system utilizing either balls or rollers and which is readily configured to enable one to take up virtually all of the clearances between various moving parts thereof.

SUMMARY OF THE INVENTION

These and other objects of this invention are achieved by providing a bearing assembly for supporting a rotatable member for rotation about a longitudinal axis thereof. The bearing assembly comprising support means, at least three separate outer races, a plurality of uniformly sized, precision rolling elements, e.g., balls or rollers, and at least three inner races. Each of the outer races comprises an circular inner surface of a respective ring member. Each of the inner races comprises a respective circular outer surface formed in the rotatable member. The circular outer surfaces are concentric and disposed laterally of one another along the axis. The ring members are disposed laterally of one another along the axis opposite to respective ones of the inner races to form therebetween respective annular spaces. A plurality of the rolling elements are located within each of the annular spaces. A first of the ring members is arranged to be adjustably moved by first means inward radially with respect to the axis from a first point on the circumference thereof to take up the clearances between the inner race, the rolling elements and the outer race at the first point. A second of the ring members is arranged to be adjustably moved by second means inward radially with respect to the axis from a second point on the circumference thereof located approximately 120 degrees from the first point to take up the clearances between the inner race, the rolling elements and the outer race at the second point. Once the ring members are moved to the desired positions they are locked in place by suitable means.

DESCRIPTION OF THE DRAWINGS

Other objects and many attendant features of this invention will become readily appreciated as the same becomes better understood by reference to the following detailed description when considered in connection with the accompanying drawings wherein:

FIG. 5 is an exploded perspective view, similar to FIG. 2, showing another embodiment of a bearing system constructed in accordance with this invention;

FIG. 8 is a sectional view showing the use of roller bearings in lieu of the ball bearings shown in FIG. 7.

DETAILED DESCRIPTION OF THE PREFERRED EMBODIMENTS

Figure 1:
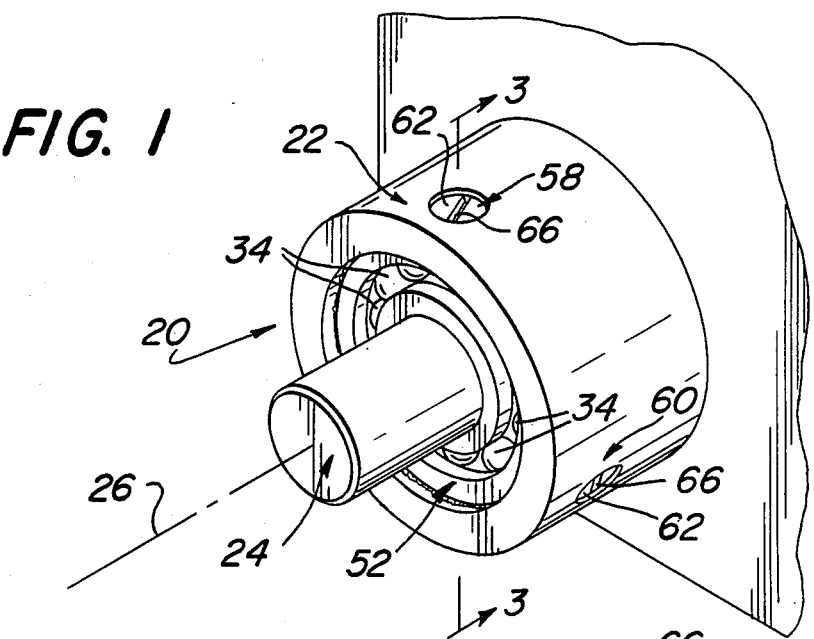
FIG. 1 is a perspective view of one embodiment of a bearing system constructed in accordance with this invention.

Referring now to various figures of the drawing where like reference numerals refer to like parts there is shown at 20 in FIG. 1 one embodiment of the bearing system of the subject invention. The bearing system is arranged to be connected to some support structure, e.g., a tubular housing 22, to support an elongated member, such as drive shaft 24, for ready rotation about its longitudinal axis 26. It must be pointed out at this juncture that the housing 22 and the drive shaft 24 are each merely exemplary. Thus, the bearing system of this invention can be used with any type of support structure to rotatively support any type of member which is to be freely rotated about an axis.

The system 20 basically comprises at least three outer races 28, 30, and 32, a plurality of identical rolling elements 34, and at least three inner races 36, 38, and 40. The inner races are fixed on the shaft 22, either directly or through use of some intermediate means (to be described later), while the outer races are fixedly secured to respective internal bore portions of the tubular housing 22 by means (as will also be described later). The inner and outer races cooperate with one another, as will also be described later, to form annular spaces in which the elements 34 are located to roll therearound. This action enables the inner and outer races to rotate with respect to one another with very little friction. During the adjustment of the rings, as will be described later, the annular spaces become slightly eccentric, with the amount of eccentricity being function the bearing's class.

As can be seen clearly in the various figures of the drawing the rolling elements are ball bearings. That type of rolling element is merely exemplary. Thus, other types of low-friction rolling elements, e.g., cylindrical rollers bearing, can be utilized. Irrespective of the type of rolling elements utilized, it is important that such elements be of a uniform size and close (high) tolerance. This requirement will not present any difficulty in the manufacture of the bearing system 20 or increase its costs appreciably, since conventional rolling elements, even relatively low cost ones, are of generally high precision and uniformity. In this connection, as will be appreciated by those skilled in the art, ball bearings and roller bearings can be readily manufactured to tolerances one or more orders of magnitude greater than the tolerances of the races in which the elements roll.

The subject invention makes use of such conventional, low-cost, yet high precision, rolling elements in combination with several low precision, races to result in a precision bearing system, i.e., one having little or no clearance between the rolling elements and the races. This is accomplished during the assembly of the system 20 by adjusting (moving) selected ones of the outer races inward radially towards the axis 26 to take up any inherent clearance between the rolling elements and the cooperating races. Once the races are moved into this position, which is referred to hereinafter as the "zero clearance" position, the races are fixedly secured in place by means (to be described later).

Figure 2:
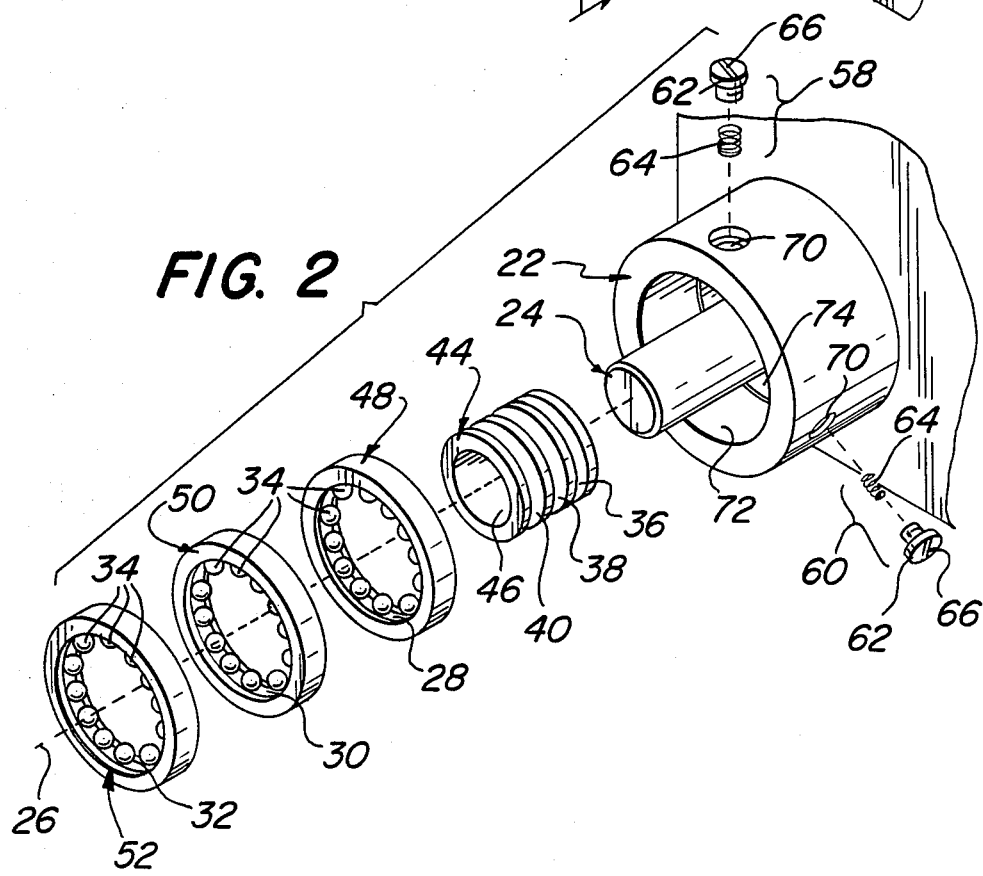
FIG. 2 is an exploded perspective view of the bearing system shown in FIG. 1.
Figure 4:
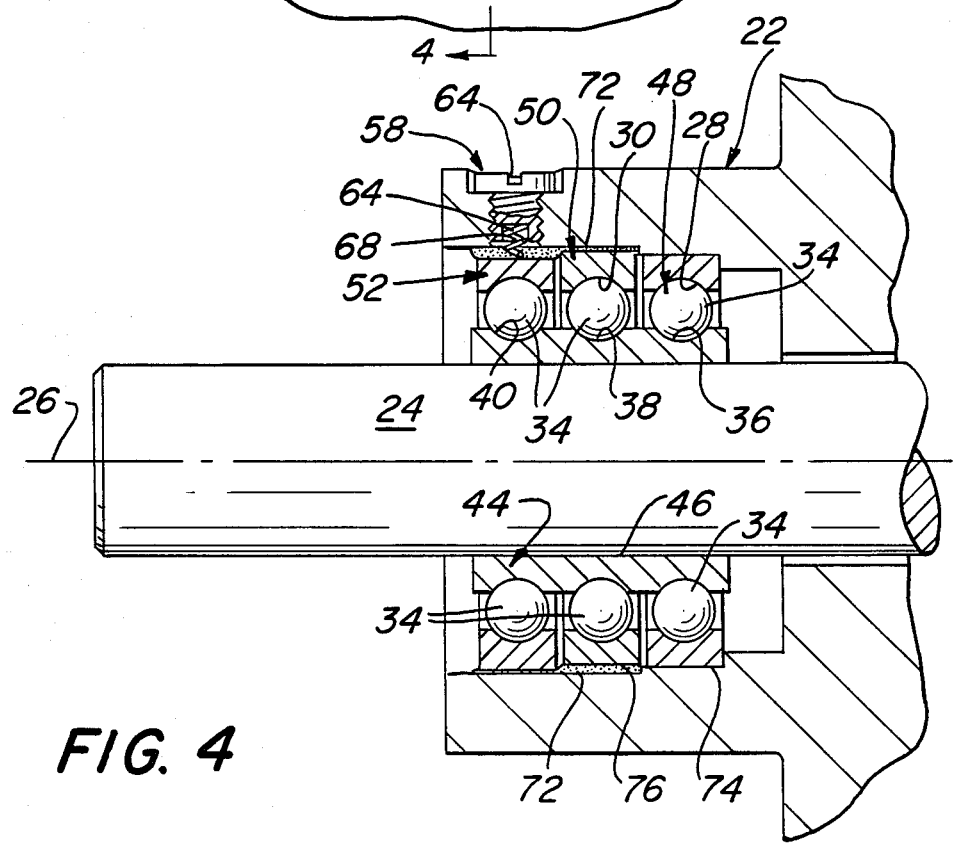
FIG. 4 is a sectional view taken along line 4—4 of FIG. 3.

Referring now to FIGS. 2 and 4, the details of the inner races 36, 38, and 40 will be described. As can be seen therein those races comprise three, longitudinally spaced, annular grooves or recesses formed in the outer periphery of a collar member 44. The cross sectional shape of each groove is arcuate and of a radius just slightly greater than the radius of each of the ball bearings 34, to enable them to roll freely therealong. In any embodiment of the invention wherein cylindrical roller bearings are used, the grooves forming the races 36, 38, and 40 will be correspondingly shaped to accommodate those bearing members.

The collar member 44 is arranged to be fixedly secured to the shaft to serve as a convenient means to carry the inner races 36, 38, and 40 instead of having those races formed, e.g., ground, in the periphery of the shaft itself. In many applications forming the races directly in the shaft may be acceptable. However, other applications, such as where it would be inconvenient or difficult to form the races in the periphery of the shaft, the use of the collar 44 is desirable. Thus, in accordance with the teaching of this invention the inner races may either form a part of the shaft 24 or be a part of a member which is fixedly secured to the shaft. In any case the inner races must be precisely concentric with one another. This can be accomplished by grinding the recesses simultaneously with one another on the collar (or directly on the shaft).

As can be seen the collar member 44 is a tubular member having a central bore 46 through which the shaft 24 extends. The central bore must also be precisely concentric with the inner races 36, 38, and 40 so that when the shaft is located therein the inner races 36, 38, and 40 are concentric about the shaft's longitudinal axis 26. The inside diameter of the bore 46 is just slightly greater than the outside diameter of the shaft 24 so that the shaft is tightly fit therein. The collar is fixedly secured by any suitable means (not shown), e.g., adhesives, set screws, etc., to the shaft so that it rotates with the shaft when the shaft is rotated.

The outer races 28, 30, and 32 are formed by respective annular grooves in the inner surfaces of three ring members 48, 50, and 52. Each annular groove is generally circular in shape, but need not be precise in size or circularity. Thus, in accordance with one aspect of this invention the outer races can be of low tolerance or precision. The cross sectional shape of each outer race is arcuate and of a radius just slightly greater than the radius of each of the ball bearing members 34, to enable them to roll freely therealong.

Figure 3:
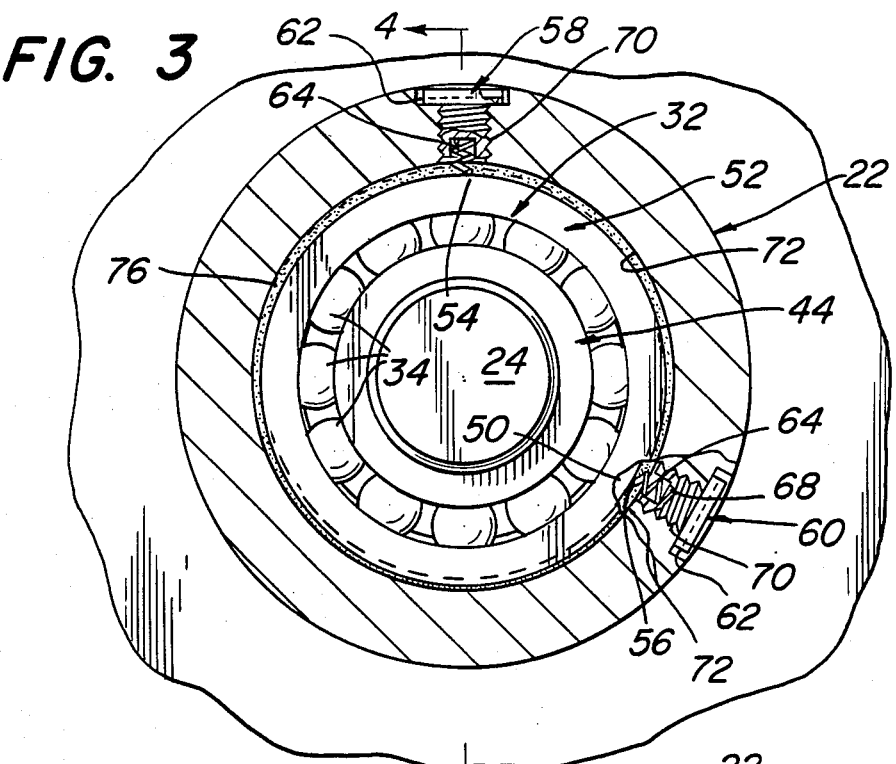
FIG. 3 is an enlarged sectional view taken along line 3—3 of FIG. 1.

As mentioned earlier the system 20 is arranged to enable the races to be moved into a zero clearance position. That position is one in which two of the rings are moved with respect to the housing 22 by means, to be described hereinafter, so that portions of those rings are radially closer to the axis 26. In particular, a portion of the ring 52 is moved radially inward toward the axis 26 from a first, selected point 54 on the periphery of the ring 52, to take up virtually all of the clearance between its outer race 32, the interposed roller bearings 34, and the inner race 40 at that selected point. Similarly, the ring 50 is moved radially inward toward the axis 26 from a second, selected point 56 on the periphery of the ring 50, to take up virtually all of the clearance between its outer race 30, the interposed roller bearings 34, and the inner race 38 at that selected point. As can be seen clearly in FIG. 3, the two points 54 and 56 are spaced from each other by 120 degrees.

The means to effect the adjustment (movement) of the rings 52 and 50 comprise set screw assemblies 58 and 60, respectively. Each assembly comprises a set screw 62 and an associated helical, compression spring 64. Each set screw has a slotted head portion 66 and an exteriorly threaded body portion into which central bore 68 extends from the free end thereof. Each set screw is disposed within a mating, threaded hole 70 (FIG. 3) in the tubular housing 22. Each hole communicates with an internal bore portion 72 in the tubular housing 22. The internal bore portion 72 serves to hold both rings 50 and 52 therein. Thus, the bore portion is circular and slightly larger in diameter than the outside diameter of those rings. It must be noted at this point that the bore portion 72 need not be precise in size, circularity, or concentricity with the axis 26 since the rings will be adjusted in position radially therein.

One helical spring is disposed within the bore 68 in one of the screws 60 and engages a portion of the outer periphery of the ring 52 at the heretofore identified first point 54, while the other spring is located within the corresponding bore in the other set screw and engages a portion of the outer periphery of the ring 50 at the heretofore identified second point 56.

The tightening of the set screw of assembly 58 causes the associated spring 64 to apply a radially inward force from point 54 on the ring 52, thereby causing the ring to move with respect to bore portion 72 toward the axis 2 until the portion of the ring 52 diametrically disposed from point 54 engages the bore portion 72 contiguous with it. This action takes up any clearance between the inner race 40 and the interposed ball bearings 34. Accordingly there will be no clearance between the inner race 40, the interposed ball bearings 34, and the outer race 32. In a similar manner the tightening of the set screw of assembly 60 causes the ring 50 to be moved radially toward the axis 26 until the portion of the ring 50 diametrically disposed from point 56 engages the bore portion 72 contiguous with it. This action takes up any clearance between the inner race 38 and the interposed ball bearings 34. Accordingly there will be no clearance between the inner race 38, the interposed ball bearings 34, and the outer race 30.

As will be appreciated by those skilled in the art the springs 64 serve to prevent any over-tightening of the set screws, which could result in damage or deformation of the rings 50 and 52 during the ring adjustment procedure.

As can be seen clearly in FIG. 4 the tubular housing 22 includes another internal bore portion 74. This bore portion serves to hold the third ring 48 therein. However, unlike bore portion 72, bore portion 74 is precisely shaped and sized to receive the ring 48 tightly therein.

As should be appreciated by those skilled in the art when the two rings 50 and 52 are adjusted in position (moved) as described heretofore each ring provides an inward radially directed force to the shaft 24 at its point of application, i.e., points 54 and 56. These two radially applied, inwardly directed forces result in the production of a force directed radially outward from a point (not shown) which is located 120 degrees from each of the points 54 and 56. This outward radially directed force is applied through the shaft to the collar member 44 forming the inner races 36, 38 and 40, thereby moving the collar radially outward. This action thus takes up any clearance between the outer race 28 and the interposed ball bearings 34. Accordingly there will be no clearance between the outer race 28, the interposed ball bearings 34, and the inner race 36. Thus at three points at 120 degree intervals measured about the axis of the shaft 24 there will be virtually no clearance so that an ultra-precision or "zero clearance" bearing system is produced.

The fact that there is no clearance for a lubricant, e.g., oil, between the ball bearings and the inner and outer races at three 120 degree points does not result in any danger to bearing system inasmuch as the rolling of the balls along the races sweeps the lubricant located in the other parts of the races over the entire surface of the races as the shaft 24 is rotated.

In order to hold the rings in the zero clearance position a suitable adhesive 76, e.g., cryano-acrylate such as sold under the trademarks LOKTIGHT or SUPER GLUE, is injected into the interstices between the bore portions 72 and 74 and the outer periphery of the associated rings. In lieu of the adhesive, additional adjusting screws or other securement means may be used.

Figure 6:
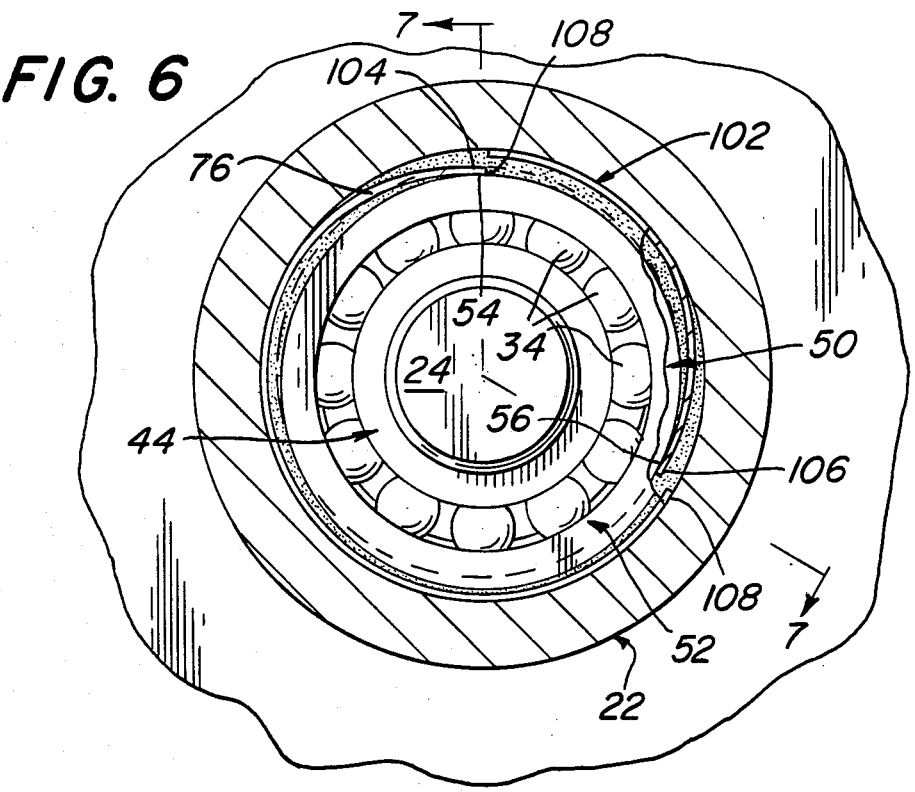
FIG. 6 is an enlarged sectional view taken along line 6—6 of FIG. 5.
Figure 7:
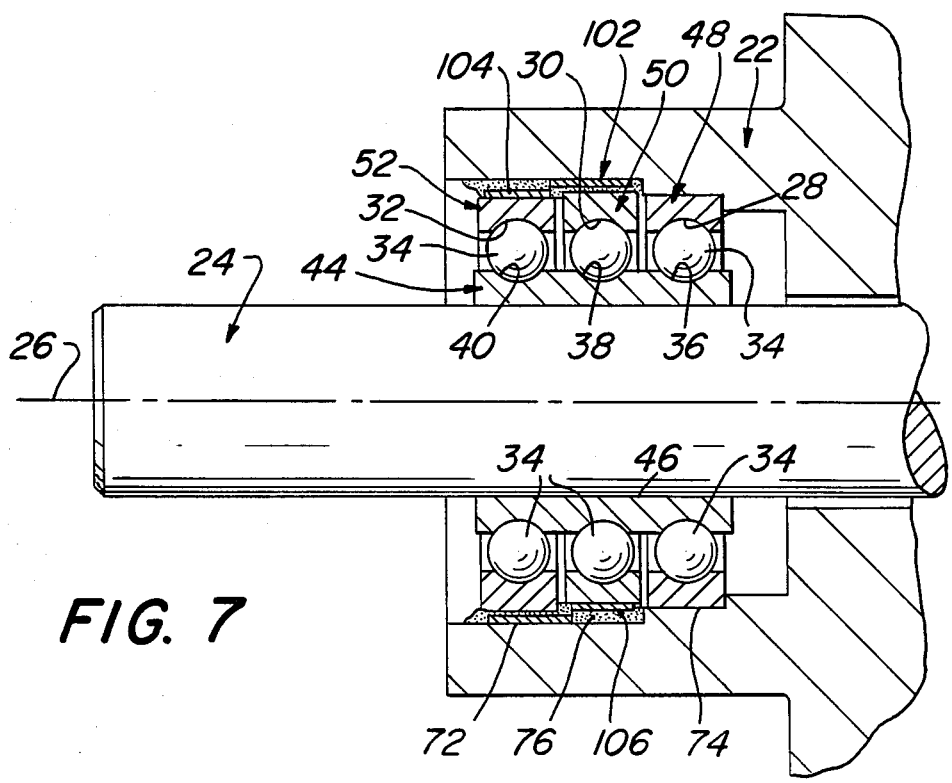
FIG. 7 is a sectional view taken along line 7—7 of the FIG. 6.

In FIGS. 5-7 there is shown an alternative embodiment 100 of this invention. That embodiment makes use of different means to effect the adjustment of the rings 50 than the set screw assemblies 58 and 60 described heretofore. Thus, bearing system 100 includes the same components as described heretofore except for the assemblies 58 and 60. In place of those assemblies is a spring collar 102. In the interest of brevity the common features and operation of systems 20 and 100 will not be reiterated. Moreover, their common components are given the same reference numbers in the figures herein.

As can be seen in FIG. 5, the spring collar 102 comprises a thin circularly shaped sleeve formed of a resilient material, e.g., spring steel. The outer and inner surfaces of the collar are concentric. The collar includes a pair of spring arms 104 and 106 cut out of the collar and located 120 degrees from each other about the periphery of the collar. Each arm includes a free end 108 which is bent so that it extends inwardly. The collar 102 is located within the bore portion 72 and surrounding the rings 50 and 52 with the free end 108 of arm 104 located at the heretofore described first point 54 and with the free end 108 of arm 106 located at the heretofore described second point 56. The outside diameter of the collar 102 is slightly less than the inside diameter of the bore portion 72. The radial distance from the free end 108 of each arm to the longitudinal axis 26 is less than half the outside diameter of the rings 50 and 52. Thus, the spring arms provide inwardly directed radial forces on the rings at those points in the same manner as provided by the set screw assemblies described heretofore. It should be pointed out at this juncture that all three rings 48, 50 and 52 can be made adjustable, if desired, rather than only having rings 50 and 52 adjustable, as described heretofore.

In FIG. 8 there is shown a sectional view of a portion of a bearing system constructed in accordance with this invention but utilizing roller bearings 34A in lieu of ball bearings 34. The shape of the races to accommodate those bearing are identified by the reference numerals 28A, 30A, 32A, 36A, 38A and 40A, corresponding to races 28, 30, 32, 36, 38 and 40, respectively, of the embodiment shown and described heretofore. The ring members are designated by the reference numbers 48A, 50A and 52A, and correspond to the ring members 48, 50 and 52 of the ball bearing embodiments described heretofore.

Without further elaboration the foregoing will so fully illustrate my invention that others may, by applying current or future knowledge, readily adapt the same for use under various conditions of service.

I claim:

1. A bearing assembly supporting a rotatable member for rotation about a longitudinal axis thereof, said bearing assembly comprising a support member, at least three outer races, a plurality of uniformly sized, precision rolling elements, and at least three inner races, each of said outer races comprising a circular surface of a respective ring member, each of said inner races comprising a respective circular outer surface formed in said rotatable member, said circular outer surfaces being substantially concentric with one another and disposed laterally of one another along said axis, said axis opposite to respective ones of said inner races to form therebetween respective annular spaces, a plurality of said rolling elements being located within each of said annular spaces, a first of said ring members being arranged to be adjustably moved by first means inward radially with respect to said axis from a first point on the circumference thereof to reduce the thickness of said annular space at said first point to substantially take up the clearances between said inner race, said rolling elements, and said outer race at said first point, a second of said ring members being arranged to be adjustably moved by second means inward radially with respect to said axis from a second point on the circumference thereof located approximately 120 degrees from said first point to reduce the thickness of said annular space at said second point to substantially take up the clearances between said inner race, said rolling elements, and said outer race at said second point, the thickness of the annular space between said inner and outer races at a third point on the circumference thereof located approximately 120 degrees from said first and second points also being reduced so that the clearances between said inner race, said rolling elements, and said outer race at said third point is substantially taken up, whereupon there is virtually no clearance between the inner and outer races and the rolling elements interposed therebetween at said first, second, and third points.

2. The bearing assembly of claim 1 wherein said inner races are precisely concentric with one another.

3. The bearing assembly of claim 2 wherein said inner races are each of the same outside diameter.

4. The bearing assembly of claim 3 wherein said inner races are formed of a unitary member.

5. The bearing assembly of claim 4 wherein each of said first and second means comprise a respective set screw extending into said support member.

6. The bearing assembly of claim 5 wherein each of said set screws is spring biased.

7. The bearing assembly of claim 4 wherein said rolling elements comprise ball bearings.

8. The bearing assembly of claim 4 wherein said rolling elements comprise roller bearings.

9. The bearing assembly of claim 1 additionally comprising locking means to secure said ring members in place once they are moved to the positions to take up said clearances.

10. The bearing assembly of claim 9 wherein said locking means comprises an adhesive.

11. The bearing assembly of claim 9 wherein each of said first and second means comprise spring biased means.

12. The bearing assembly of claim 11 wherein each of said spring biased means comprise a ring having at least two spring portions thereon, said portions being disposed at approximately 120 degrees from each other, with each of said portions being arranged to provide an inwardly, radially directed force.

13. The bearing assembly of claim 1 wherein each of said first and second means comprise a respective set screw extending into said support member.

14. The bearing assembly of claim 1 wherein each of said first and second means comprise spring biased means.

15. The bearing assembly of claim 14 wherein each of said spring biased means comprise a ring having at least two spring portions thereon, said portions being disposed at approximately 120 degrees from each other, with each of said portions being arranged to provide an inwardly, radially directed force.

16. The bearing assembly of claim 12 wherein said rolling elements comprise ball bearings.

17. The bearing assembly of claim 12 wherein said rolling elements comprise roller bearings.

18. A bearing assembly supporting a rotatable member for rotation about a longitudinal axis thereof, said bearing assembly comprising a support member, at least three outer races, a plurality of uniformly sized, precision rolling elements, at least three inner races, and locking means, each of said outer races comprising a circular inner surface of a respective ring member, surface formed in said rotatable member, said circular outer surfaces being concentric and disposed laterally of one another along said axis, said ring members being disposed laterally of one another along said opposite to respective ones of said inner races to form therebetween respective annular spaces, a plurality of said rolling elements being located within each of said annular spaces, a first of said ring members being arranged to be adjustably moved by first means inward radially with respect to said axis from a first point on the circumference thereof to substantially take up the clearances between said inner race, said rolling elements and said outer race at said first point, a second of said ring members being arranged to be adjustably moved by second means inward radially with respect to said axis from a second point on the circumference thereof located approximately 120 degrees from said first point to substantially take up the clearances between said inner race, said rolling elements and said outer race at said second point, said locking means securing said ring members in place once they are moved to the positions to take up said clearances, said locking means comprises an adhesive.

19. A bearing assembly supporting a rotatable member for rotation about a longitudinal axis thereof, said bearing assembly comprising a support member, at least three outer races, a plurality of uniformly sized, precision rolling elements, and at least three inner races, each of said outer races comprising a circular inner surface of a respective ring member, each of said inner races comprising a respective circular outer surface formed in said rotatable member, said circular outer surfaces being concentric and disposed laterally of one another along said axis, said ring members being disposed laterally of one another along said axis opposite to respective ones of said inner races to form therebetween respective annular spaces, a plurality of said rolling elements being located within each of said annular spaces, a first of said ring members, being arranged to be adjustably moved by first means inward radially with respect to said axis from a first point on the circumference thereof to substantially take up the clearances between said inner race, said rolling elements and said outer race at said first point, a second of said ring members being arranged to be adjustably moved by second means inward radially with respect to said axis from a second point on the circumference thereof located approximately 120 degrees from said first point to substantially take up the clearances between said inner race, said rolling elements and said outer race at said second point, said locking means securing said ring members in place once they are moved to the positions to take up said clearances, each of said first and second means comprising a respective set screw extending into said support member.

20. A bearing assembly supporting a rotatable member for rotation about a longitudinal axis thereof, said bearing assembly comprising a support member, at least three outer races, a plurality of uniformly sized, precision rolling elements, at least three inner races, and locking means, each of said outer races comprising a circular inner surface of a respective ring member, each of said inner races comprising a respective circular outer surface formed in said rotatable member, said circular outer surfaces being concentric and disposed laterally of one another along said axis, said ring members being disposed laterally of one another along said axis opposite to respective ones of said inner races to form therebetween respective annular spaces, a plurality of said rolling elements being located within each of said annular spaces, a first of said ring members being arranged to be adjustably moved by first means inward radially with respect to said axis from a first point on the circumference thereof to substantially take up the clearances between said inner race, said rolling elements and said outer race at said first point, a second of said ring members being arranged to be adjustably moved by second means inward radially with respect to said axis from a second point on the circumference thereof located approximately 120 degrees from said first point to substantially take up the clearances between said inner race, said rolling elements and said outer race at said second point, said locking means securing said ring members in place once they are moved to the positions to take up said clearances, each of said first and second means comprising a respective set screw extending into said support member.

21. A bearing assembly supporting a rotatable member for rotation about a longitudinal axis thereof, said bearing assembly comprising a support member, at least three outer races, a plurality of uniformly sized, precision rolling elements, and at least three inner races, each of said outer races comprising a circular inner surface of a respective ring member, each of said inner races comprising a respective circular outer surface formed in said rotatable member, said circular outer surfaces being concentric and disposed laterally of one another along said axis, said ring members being disposed laterally of one another along said axis opposite to respective ones of said inner races to form therebetween respective annular spaces, a plurality of said rolling elements being located within each of said annular spaces, a first of said ring members being arranged to be adjustably moved by first means inward radially with respect to said axis from a first point on the circumference thereof to substantially take up the clearances between said inner race, said rolling elements and said outer race at said first point, a second of said ring members being arranged to be adjustably moved by second means inward radially with respect to said axis from a second point on the circumference thereof located approximately 120 degrees from said first point to substantially take up the clearances between said inner race, said rolling elements and said outer race at said second point, each of said first and second means comprising spring biased means.

22. A bearing assembly supporting a rotatable member for rotation about a longitudinal axis thereof, said bearing assembly comprising a support member, at least three outer races, a plurality of uniformly sized, precision rolling elements, at least three inner races, and locking means, each of said outer races comprising a circular inner surface of a respective ring member, each of said races comprising a respective circular outer surface formed in said rotatable member, said circular outer surfaces being concentric and disposed laterally of one another along said axis, said ring members being disposed laterally of one another along said axis opposite to respective ones of said inner races to form therebetween respective annular spaces, a plurality of said rolling elements being located within each of said annular spaces, a first of said ring members being arranged to be adjustably moved by first means inward radially with respect to said axis from a first point on the circumference thereof to substantially take up the clearances between said inner race, said rolling elements and said outer race at said first point, a second of said ring members being arranged to be adjustably moved by second means inward radially with respect to said axis from a second point on the circumference thereof located approximately 120 degrees from said first point to substantially take up the clearances between said inner race, said rolling elements and said outer race at said second point, said locking means securing said ring members in place once they are moved to the positions to take up said clearances, each of said first and second means comprising spring biased means.

* * * * *